US009058759B2

(12) United States Patent
Beeler et al.

(10) Patent No.: US 9,058,759 B2
(45) Date of Patent: Jun. 16, 2015

(54) VIRTUAL DISPLAY DEVICE DRIVERS COMPATIBLE WITH WINDOWS DISPLAY DRIVER MODEL

(71) Applicants: Dean Beeler, Portland, OR (US); David Howell, Portland, OR (US)

(72) Inventors: Dean Beeler, Portland, OR (US); David Howell, Portland, OR (US)

(73) Assignee: AVATRON SOFTWARE, INC., Portland, OR (US)

( * ) Notice: Subject to any disclaimer, the term of this patent is extended or adjusted under 35 U.S.C. 154(b) by 231 days.

(21) Appl. No.: 13/918,712

(22) Filed: Jun. 14, 2013

(65) Prior Publication Data

US 2013/0335431 A1    Dec. 19, 2013

Related U.S. Application Data

(60) Provisional application No. 61/659,427, filed on Jun. 14, 2012.

(51) Int. Cl.
*G09G 5/00* (2006.01)
*G06F 9/44* (2006.01)
*G06F 3/14* (2006.01)

(52) U.S. Cl.
CPC .............. *G09G 5/006* (2013.01); *G06F 3/1454* (2013.01); *G06F 9/4411* (2013.01); *G06F 9/4445* (2013.01); *G06F 3/14* (2013.01)

(58) Field of Classification Search
CPC ...................................................... G09G 5/006
See application file for complete search history.

(56) References Cited

U.S. PATENT DOCUMENTS

| | | | |
|---|---|---|---|
| 2005/0246718 A1* | 11/2005 | Erlingsson et al. | 719/317 |
| 2011/0029694 A1* | 2/2011 | Blinzer | 710/9 |
| 2012/0042252 A1* | 2/2012 | Neerudu et al. | 715/733 |
| 2012/0084517 A1* | 4/2012 | Post et al. | 711/153 |
| 2012/0110237 A1* | 5/2012 | Li et al. | 711/6 |

* cited by examiner

*Primary Examiner* — Kee M Tung
*Assistant Examiner* — Grace Q Li
(74) *Attorney, Agent, or Firm* — Rylander & Associates, PC; Philip R. M. Hunt

(57) ABSTRACT

A virtual display system, compatible with Windows Display Driver Model (WDDM), facilitates extending a display virtually, to any display target, such as a window on the primary display, a tablet, or another personal computer altogether. The virtual WDDM display system device has a PCI filter driver, a virtual device user mode driver and a virtual device kernel mode driver. The virtual WDDM display system interacts with a physical WDDM display device, which it uses as a surrogate renderer. The PCI filter driver is used to force enumeration of a virtual display device. The virtual device kernel mode driver uses chained callbacks at increasing IRQ levels for simulating an interrupt from a real hardware device. Continuous segments in memory are used to simulate video memory on a physical display device. DirectX extensions are used to facilitate expectations at the hardware level.

13 Claims, 6 Drawing Sheets

VIRTUAL DISPLAY DEVICE DRIVERS COMPATIBLE WITH WINDOWS DISPLAY DRIVER MODEL

CROSS-REFERENCE TO RELATED APPLICATION

The present application claims the benefit of, and priority to, U.S. Provisional Application No. 61/659,427 filed on 14 Jun. 2012, incorporated herein by reference.

FIELD OF THE INVENTION

This invention is related to the field of computer display monitors. In particular, this invention is related to virtual display device drivers compatible with the Windows Display Driver Model (WDDM) architecture for display drivers.

BACKGROUND

Using multiple, wired, physical monitors simultaneously is a common practice among computer users. There are several solutions available today that provide this using hardware present on the computer system itself. There are also several software solutions that make a virtual display within the computer system and make the virtual display available to a monitor or other device connected to the computer in ways other than with standard video cables. Current software solutions are hampered by the limitations of Windows 7 and later operating systems in making virtual displays available to the user.

Windows Vista introduced a new driver model that was tied very closely to hardware. As such, it was not intuitive to developers how a virtual version of this driver model could be accomplished. According to requirements set by Microsoft, a display adapter (also called a "physical display device", a "video card", and a "graphics card") has to appear as though it was both physically attached to the computer system and had physical resources for use. If a device driver is written without appearing as though it is tied to physical hardware in the computer system, the operating system will consider the driver invalid and refuse to proceed.

Solutions adequate for previous versions of Windows employed a well-documented mechanism by which a mirror display driver projected a mirror display beyond the bounds of the existing display. Due to an accidental or intentional design consideration by Microsoft, this appeared as a new physical display to versions of Windows older than Windows 7.

Since Windows Vista, however, the newly proposed architecture for display drivers, known as the Windows Display Driver Model (WDDM) architecture superseded the old architecture, known as the XP Driver Model (XPDM). Since mirror drivers were strictly XPDM in design, they are now obsolete on machines running Windows 7 and newer Microsoft operating systems. For Windows 8, there is no mechanism by which XPDM display drivers can continue to be used. Without mirror drivers, there is no obvious way to virtually extend a desktop with Windows 8 and potentially any future Microsoft operating system releases.

It's important to note that even though Windows 7 is compatible with XPDM display drivers, the computer system will suffer noticeable performance degradation while such drivers are in use. When used with adequate hardware, Windows Vista and later versions use an accelerated desktop mode known as Aero. This desktop mode enhances the look-and-feel of the display, both aesthetically and in responsiveness to the user. Aero was pitched as one of the enhanced features of Windows Vista and many users expect it as part of their experience. Unfortunately, with an active XPDM display driver, Windows is forced to disable Aero to provide a compatibility mode between the physical display device and the enumerated virtual one. One consequence for some applications while in this mode, beyond a changed aesthetic, is reduced rendering performance.

Another solution that has been presented is installing a filter driver over a functioning physical display adapter within the computer system. This filter driver is transparent to the physical display device and simply modifies the physical display device's behavior slightly so as to force an additional display on the physical display device.

In a sense, this filtering method works by tricking the physical display adapter into sensing that another physical monitor has been connected to the computer system. The filter driver then intercepts this output and renders it to an alternate target. This method does not force Windows into a compatibility mode like XPDM drivers do, and it is generally successful in making an additional display available to the user. This solution is less than ideal, however, as it requires intimate knowledge of drivers made by specific hardware manufacturers. The risk is high that when a manufacturer releases an update of their display drivers, subtle changes may break compatibility with this filtering method. Moreover, this method is exceptionally incompatible with Windows 8 and later versions, and may not be possible at all.

Another drawback to this filtering approach is that since it forces display detection in physical hardware, previously existing hardware can present problems with activating a virtual display. This filtering method is generally incompatible with computer systems where multiple monitors are already in use. Additionally, this method is also limited by the physical hardware as to how many actual virtual monitors may be iterated on the physical display device.

SUMMARY AND ADVANTAGES

A virtual display system, compatible with Windows Display Driver Model (WDDM), facilitates extending a display virtually, to any display target, such as a window on the primary display, a tablet, or another personal computer altogether. The virtual WDDM display system device has a PCI filter driver, a virtual device user mode driver and a virtual device kernel mode driver. The virtual WDDM display system interacts with a physical WDDM display device, which it uses as a surrogate renderer. The PCI filter driver is used to force enumeration of a virtual display device. The virtual device kernel mode driver uses chained callbacks at increasing IRQ levels for simulating an interrupt from a real hardware device. Continuous segments in memory are used to simulate video memory on a physical display device. Hardware device calls are used to facilitate expectations at the hardware level.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

The primary purpose of this invention is to provide a virtually extended desktop to Windows by circumventing the limitations of the WDDM in its hardware requirements. Without consideration given to the specific hardware requirements of the WDDM, this approach would not be possible.

Figure 1:
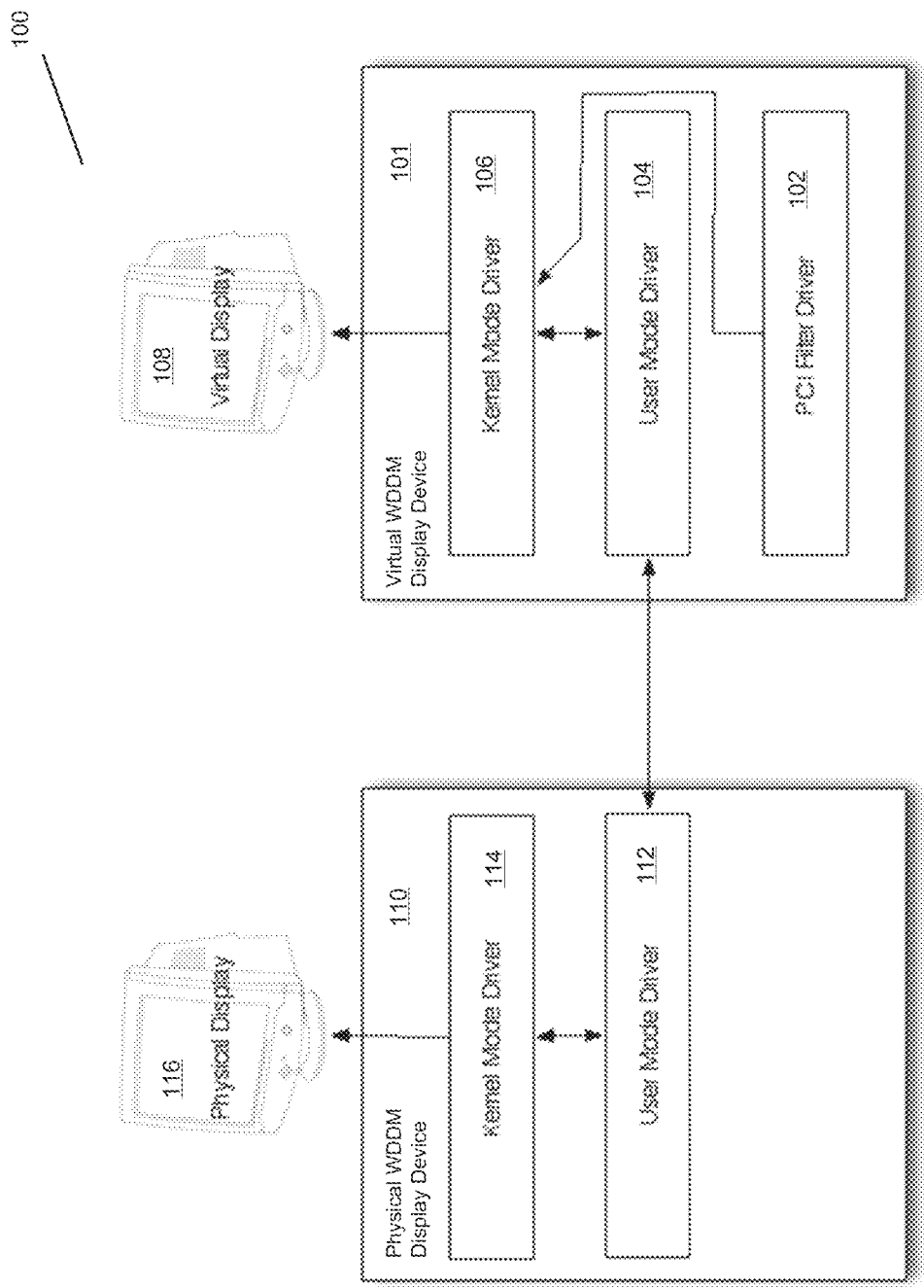
FIG. 1 shows a virtual WDDM display system with related physical components and their interaction.

FIG. 1 shows a virtual WDDM display system 100 with related physical components. The primary components of the virtual WDDM display system 100 are a PCI filter driver 102, a virtual device user mode driver 104 and a virtual device kernel mode driver 106. From the perspective of Windows, a WDDM driver used in driving a display, real or virtual, has two mandatory parts. The first part is a kernel mode driver (also called a "miniport driver"). This manages memory, resources and system level interaction with the CPU and interrupts. The second part is a user mode driver. The user mode driver component does the direct interaction with the video hardware, building buffers, maintaining state and presenting rendered scenes to the user. The virtual WDDM display system 100 interacts with a physical WDDM display device 110, a physical display user mode driver 112 and a physical display kernel mode driver 114. The physical WDDM display driver 110 is configured to drive a physical display 116. The virtual WDDM display system 100 is configured to create a virtual WDDM display device 101 that is configured to drive a virtual display 108.

For Windows Vista and later to enumerate a WDDM driver for a device, several things are required. First, the device must appear enumerated off of the PCI bus. It must have a functional IRQ and physical memory must be reserved for the device. Lacking any of these requirements results in Vista and later Windows operating systems ignoring and refusing to load the device driver.

A method by which one can address the hardware requirements of WDDM is by having the computer system itself provide resources as though an actual device had been physically connected to the machine. This is accomplished via the PCI filter driver 102 and provides for the "detection" and operation of the virtual WDDM display device 101. A filter driver is a thin driver that the operating system loads above or underneath a functional driver in the computer system. The filter driver then modifies the behavior of the underlying device. In this case, the PCI filter driver 102 modifies the behavior of the underlying physical PCI device driver 122 and makes it appear as though a real video card (physical display device) is attached to the PCI bus. During initialization, the PCI filter driver 102 also asks the operating system to reserve resources that a physical display device would need, namely an IRQ and memory in the physical computer system address space.

Another component of the virtual WDDM display system 100 is the virtual display kernel mode driver 106. Its functionality is substantially different from the physical display kernel mode driver 114 since no physical display device (video card) exists with which the virtual display kernel mode driver 106 is associated. As such, the virtual display kernel mode driver 106 mostly functions to simulate an equivalent management of memory and resources that a physical display device would provide. While the operating system itself manages and pages video memory allocations, the virtual display kernel mode driver 106 makes available the allocated video memory pages and manages the movement of data between system memory and video memory. Because no video memory exists for the virtual display kernel mode driver 106, it uses a virtual video memory 142, which is a contiguous memory space allocated by the operating system in system memory. This contiguous virtual video memory 142 is then mapped virtually to a shared video memory 144, which is a shared memory space in user memory. The shared video memory 144 is used by the virtual display kernel mode driver 106, virtual display user mode driver 104 and remote display server software 120.

Another component of the virtual WDDM display system 100 is the virtual display user mode driver 104. The virtual display user mode driver 104 is a component that is instantiated when an application in Windows needs access to DirectX surfaces or needs to execute rendering commands for the virtual external display 108. The primary application using a DirectX surface to present displays to the user is the Windows Display Window Manager (DWM). Once the user has triggered the virtual display 108, the DWM will obtain an instance of the virtual display user mode driver 104. On initialization, the virtual display user mode driver 104 will search the computer system for an available physical display device 110 and obtain an instance of its physical display user mode driver 112. From this point, the physical display device will serve as a surrogate renderer for the virtual WDDM display system 100. For every additional instance of a virtual display, an additional surrogate physical display device is marshaled. Coordination between instances of the virtual display user mode driver 104 is orchestrated by the operating system itself or by the virtual display kernel mode driver 106. Ultimately, rendered surfaces for the virtual display 108 are obtained through the shared video memory 144 and shared between three major components of the virtual WDDM display system 100: the virtual display kernel mode driver 106, the virtual display user mode driver 104, and remote display server software 120.

The remote display server software 120 is the most abstract component of the virtual WDDM display system 100. Its primary purpose is to obtain and display in some manner the rendered contents of primary surfaces as generated by the virtual display user mode driver 104 instances. The destination for this rendering could be on a monitor in the local computer system as a distinct window, or on a remote desktop or on a mobile device. In some embodiments, the remote display server software 120 could also serve as the delegate for user interaction with the virtual display, in terms of simulated UI components (the mouse, keyboard, etc.) and activation and deactivation of the virtual display 108.

Figure 2:
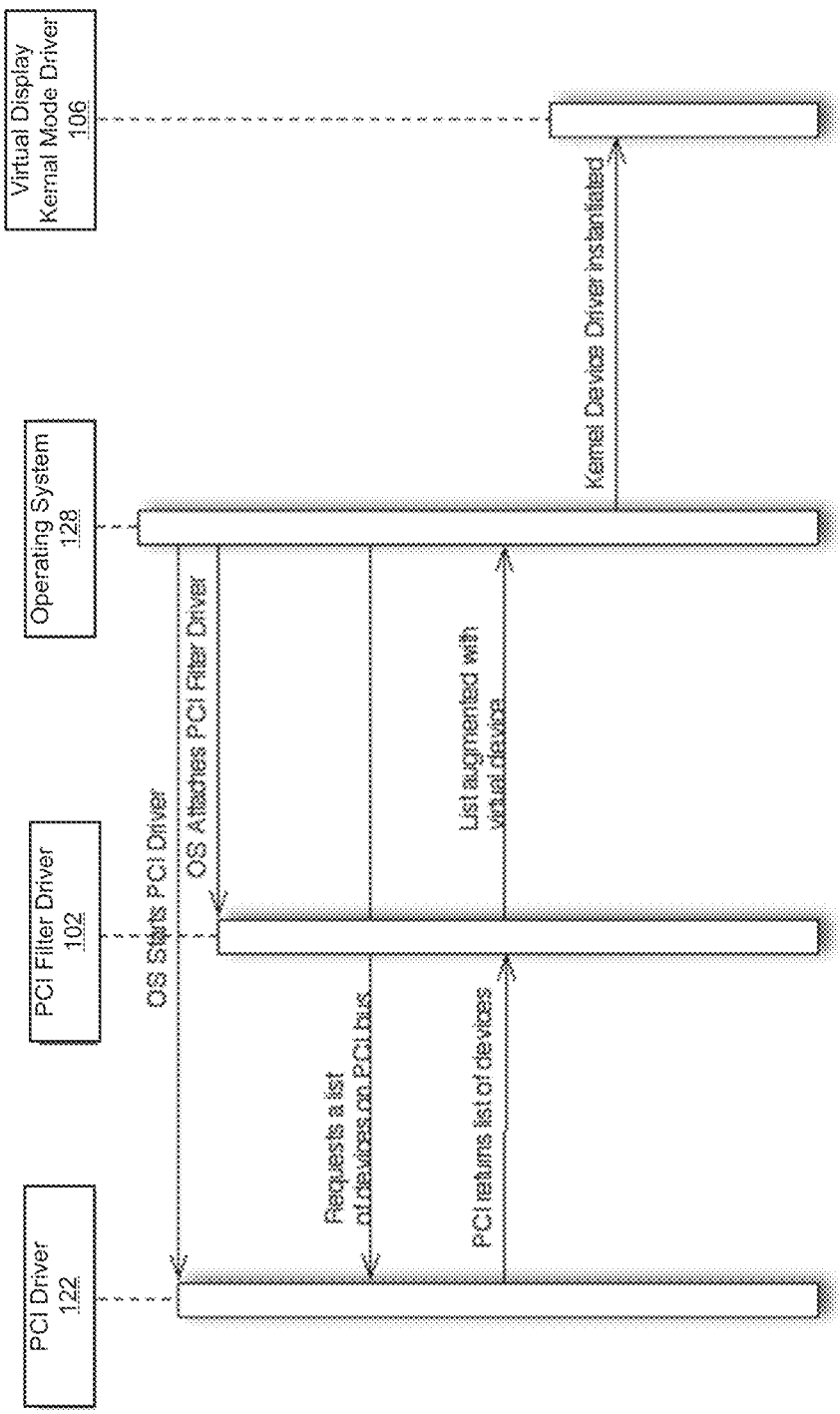
FIG. 2 shows the process by which the PCI filter driver, in tandem with the PCI driver, makes the necessary physical hardware presentation for the attachment and detection of the virtual WDDM display device by the operating system.

FIG. 2 shows the process by which the PCI filter driver 102, in tandem with the PCI driver 122, makes the necessary physical hardware presentation for the attachment and detection of the virtual WDDM display device 101 by the operating system. The operating system starts the PCI driver 122, and then attaches the PCI filter driver 102 to the PCI driver 122. The operating system then requests a list of devices on the PCI bus. The PCI driver 122 returns a list of devices on the PCI bus. The PCI filter driver 122 adds a hardware ID for the virtual WDDM display device 101 to the list of devices (an enumerated stack) as discovered by the PCI driver 122. During initialization, the PCI filter driver 102 also requests resources, namely some system memory and a hardware IRQ for use with the virtual WDDM display device 101. The operating system then obtains an instance of the virtual display kernel mode driver 106. After the virtual display kernel mode driver 106 is instantiated by the operating system, the requested resources will be acknowledged by the virtual display kernel mode driver 106.

Figure 3:
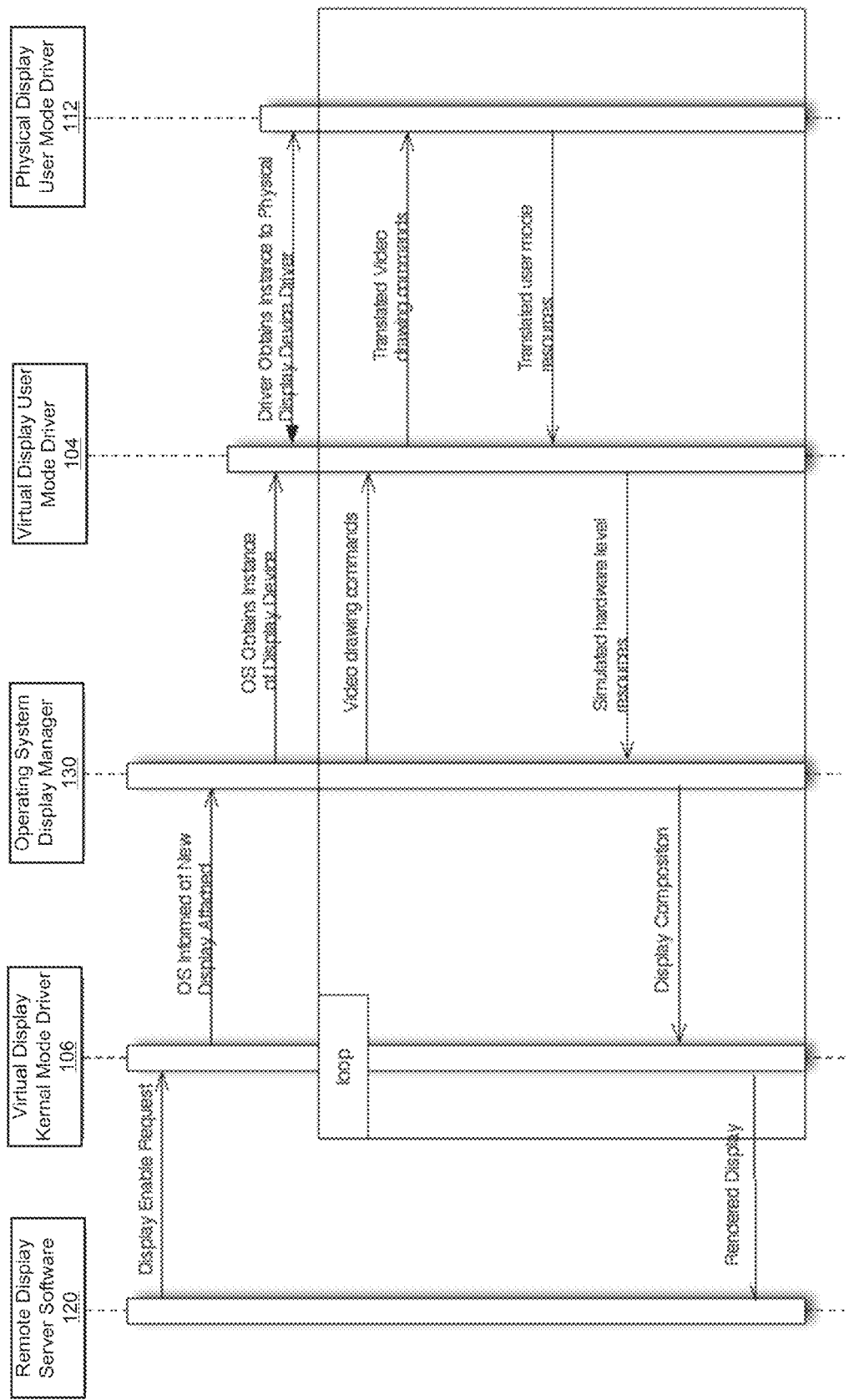
FIG. 3 shows the process for enabling the virtual display and a graphical processing loop between virtual components and physical components.

FIG. 3 shows the process for enabling the virtual display 108 and a graphical processing loop between virtual components and physical components. Once the operating system has installed the virtual kernel mode driver 106, it is up to a configuration parameter or an external event to trigger the additional screen, and thereby activating the additional components of the virtual WDDM display system 100. In some implementations it may be desirable to enable the entire virtual WDDM display system 100 on boot up. In this configuration the virtual display 108, if primary, could function as a completely detached display for the entire operation of the computer system in an otherwise headless system. However, in the embodiment discussed hereafter, activating additional components of the virtual WDDM display system 100 is triggered by user intervention.

To enable the virtual display 108, remote display server software 120 sends a request to enable the virtual display 108 to the virtual display kernel mode driver 106. The virtual display kernel mode driver 106 then informs the operating system display manager 130 of this request. The operating system display manager 130 obtains an instance of the virtual display user mode driver 104. The virtual display user mode driver 104 will then search the computer system for an available physical display adapter and obtain an instance of the physical display user mode driver 112.

Once the virtual display 108 has been enabled, the operating system remains in communication with the virtual WDDM display system 100 in a loop. Drawing commands are sent to the virtual display user mode driver 104 for translation. The virtual display user mode driver 104 then sends translated video drawing commands to the physical display user mode driver 112. For commands that result in the creation of resources, the physical display user mode driver 112 returns translated user mode resources to the virtual display user mode driver 104. The virtual display user mode driver 104 then maps these translated user mode resources to simulated hardware level resources and passes their handle(s) to the operating system display manager 130. The result of these commands is the operating system compositing the final image for display. This is received by the shared video memory 144 managed by the virtual display kernel mode driver 106. The virtual display kernel mode driver 106 then sends the rendered display to the remote display server software 120, which sends the rendered display to the remote virtual display 108.

A kernel mode driver is required by the WDDM specification. It handles memory and resource management, video present network (VidPn) enumeration, device creation and destruction, interrupt acknowledgement, and any miscellaneous functionality like power management and device status reporting. For the virtual WDDM display driver 100, most of the functionality of the virtual display kernel mode driver 106 is standard in its implementation. The virtual display kernel mode driver 106 must report itself as actual hardware. It must load, reset and unload itself like any other real hardware device.

However, several steps are needed within the virtual display kernel mode driver 106 since it differs somewhat from a physical display device. As no physical display device hardware exists with which the virtual display kernel mode driver 106 interacts, many of the functions are approximated to simulate real hardware.

Figure 4:
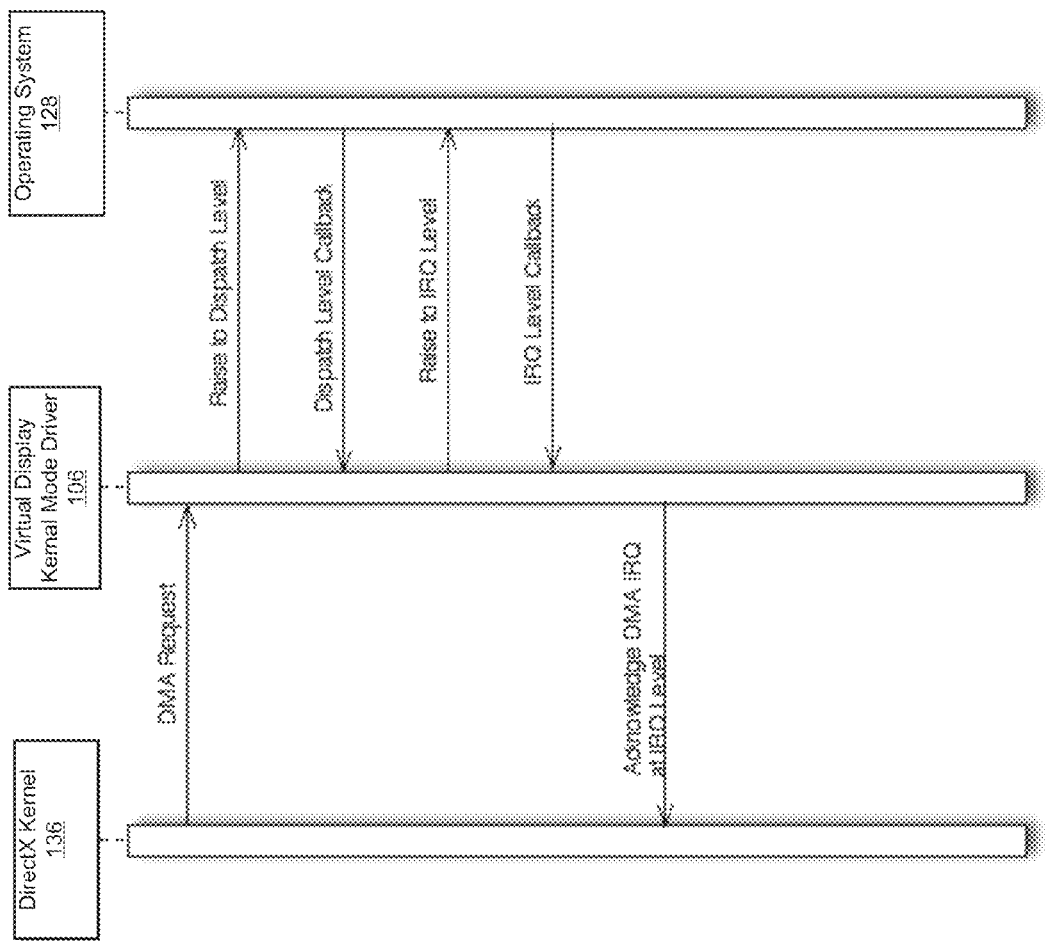
FIG. 4 shows the triggering mechanism for a simulated interrupt as required by the operating system.

FIG. 4 shows the triggering mechanism for a simulated interrupt as required by the operating system. To comply with the WDDM specification, the operating system maintains interrupts with regard to Direct Memory Access (DMA) transfers and vertical synchronization (v-sync) timers. While the operating system itself registers the interrupt for the virtual display kernel mode driver 106, the virtual display kernel mode driver 106 must report triggered interrupts as expected by the operating system. Interrupts, for real video hardware, are triggered upon vertical synchronization and DMA transfers. Without any real hardware to generate the interrupts, the virtual display kernel mode driver 106 must simulate this via a cascade of increasing IRQ levels. Without acknowledging these interrupts back to the operating system, the operating system will presume the hardware has entered a locked state and is functionally defective. As a remedial measure, it will attempt to restart the device. If no further interrupts are ever acknowledged, the operating system will fatally crash.

Acknowledgements for DMA and v-sync intervals must be sent at interrupt level (IRQ level) to be properly processed. The DirectX Kernel 136 for acknowledging DMA and vertical synchronizations functions only at interrupt level and when called from any other IRQ level will result in a system crash.

Machine instructions running at passive level (the lowest privileged running level in the Windows operating system) cannot immediately elevate themselves to IRQ level. Instead, a step-wise series of calls must be made to obtain IRQ level execution. This step-wise architecture is shown in FIG. 4. The first call to the operating system requests dispatch level. Once the operating system returns from the delayed call, the code will be executing in a separate routine at dispatch level and ready to be elevated to interrupt level. A final callback calls into an additional routine running at interrupt level. It is in this routine that interrupts are acknowledged with the DirectX Kernel 136.

Another function of the virtual display kernel mode driver 106 is notifying the operating system that a display has been attached or removed from the adapter. This is made via simple callback to the DirectX Kernel 136 indicating whether a child device has been attached or removed. Upon display attachment, the DirectX Kernel 136 will then interrogate the virtual display kernel mode driver 106 to form a proper video present network topology. The video present network topology is a mandatory part of a WDDM driver that defines what combinations of display modes are available on which paths on the device. For example, that it is possible that a video adapter may be able to mirror 2560×600 content onto a 1080p HDTV. By iterating through display paths and modes, the operating system will be able to deduce this and thereby properly present such an option to the user when configuring their mirroring setup between a possible monitor and HDTV. While this functionality is required for any WDDM driver, real or virtual, the specific implementation is within the known art and it is arbitrary what modes are presented to the operating system for display, so long as a viable mode is ultimately available.

Figure 5:
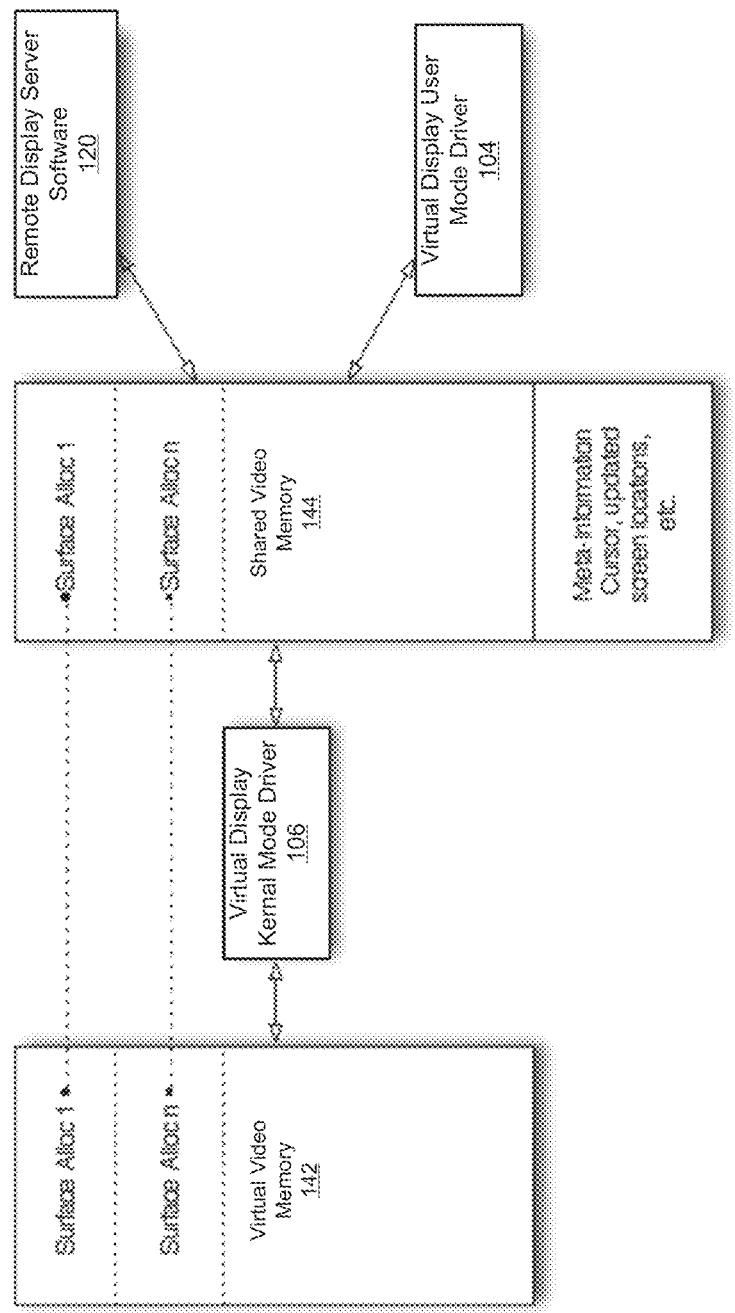
FIG. 5 outlines the communication and shared memory mechanism utilized by the individual components of the virtual WDDM display system.

FIG. 5 outlines the communication and shared memory mechanism utilized by the individual components of the virtual WDDM display system. When in Aero compositing mode, the operating system manages most surfaces for display via shared resources somewhere in system memory. These resources, the contents of which will ultimately end up being composited onto a primary surface obtained with physical hardware, do not need to be managed by the virtual display kernel mode driver 106. However, when in compatibility mode (also known as the Basic Windows theme) compositing is done via a series of DMA commands and the surfaces are sourced from virtual video memory 142. As this requires synchronization with the remote display server software 120, any instances of the virtual display user mode driver 104, the operating system kernel (not shown), along with the virtual display kernel mode driver 106 itself, the shared video memory 144 is employed to orchestrate the surfaces.

This synchronization method is diagramed in FIG. 5. The DirectX Kernel 136 will configure resource allocations and patch them into a portion of the system memory (the virtual video memory 142) allocated by the virtual display kernel mode driver 106. The addresses given will be physical, linear, system non-paged and contiguous addresses within the range of the continuous memory allocations obtained by the virtual display kernel mode driver 106. These allocation locations in the virtual video memory 142 will be matched internally by the virtual display kernel mode driver 106 to the shared video memory 144. Whenever the virtual display user mode driver 104 needs to reference these resources, the virtual display kernel mode driver 106 is queried for their relative equivalent location in the shared video memory 144. By matching allocations between the shared video memory 144 and the virtual video memory 142, later when the virtual display kernel mode driver 106 is engaged in composition, offsets in the shared video memory 144 will match to offsets specified in the kernel resource allocations, simplifying composition greatly.

In addition to surface management, the virtual display kernel mode driver 106 also receives the mouse cursor state and image from the DirectX Kernel 136. Using the shared video memory 144, the mouse parameters (location, visibility, bitmap, etc.) are duplicated for access by either the virtual display user mode driver 104 or the remote display server software 120.

The virtual display user mode driver 104 provides most of the functionality needed for rendering. The virtual display user mode driver 104 operates in conjunction with physical hardware as outlined in FIG. 3 and acts as a software bridge between a physical display adapter and the virtual display 108. Device and resource creation are initially triggered from other user mode applications. In Windows, the DWM is itself a user mode application and as such, the first application to generally obtain an instance of the virtual display user mode driver 104 is the DWM. From there, additional applications will spawn additional instances of the virtual display user mode driver 104 as necessary and it is important that they are properly coordinated through the shared video memory 144.

The virtual display user mode driver 104 emulates hardware-like behavior as much as possible. For many of its functions as software bridge, a driver implementation looks almost identical to its DirectX API analogue. For many calls, the same number of parameters and their respective meanings overlap. However, for many other functions there is a stark contrast between expected behaviors.

Resource creation is an example of a function where the public DirectX API differs greatly from what is expected at the user mode driver level. The operating system expects drivers to be able to manage and share resources through system memory without any restriction. Contrast this with a restriction in the DirectX user API, which only permits render textures to be placed within memory that is shared between the operating system and video card.

Because the operating system expects vertex buffers, index buffers, and other non-texture surfaces to also be present in system memory, the virtual display user mode driver 104 simulates this by copying between the physical display adapter's video memory and the expected location in system memory for every lock operation. This incurs a minor performance penalty but allows the virtual display user mode driver 104 to adequately simulate the hardware requirements of the operating system.

Additionally, this software bridge applies to functions that need mapped parameters as well. In the case of drawing primitives, the API for the virtual display user mode driver 104 exposes a single draw primitive function. By comparison, the DirectX system API exposes different functions for where vertex information is drawn. One function draws vertexes from an actual vertex buffer, where as another draws straight from system memory. For its API to be WDDM compliant, the virtual display user mode driver 104 is required to implement a single function that covers both of these circumstances.

As such, upon receiving a function call from the operating system display manager 130 via a DirectX 3D runtime module 138, the virtual display user mode driver 104 decides, given particular parameters, which functional call to make to the display device (physical display adapter). If the primitive drawing function is called when the vertex stream source is specified from user memory, then the virtual display user mode driver 104 will branch the bridged function to the DirectX API call that draws straight from system memory. Otherwise, when a vertex buffer on the physical WDDM display device 110 (physical display adapter) has the necessary primitives, the virtual display user mode driver 104 will call the function to draw straight from the vertex buffer in video memory.

Figure 6:
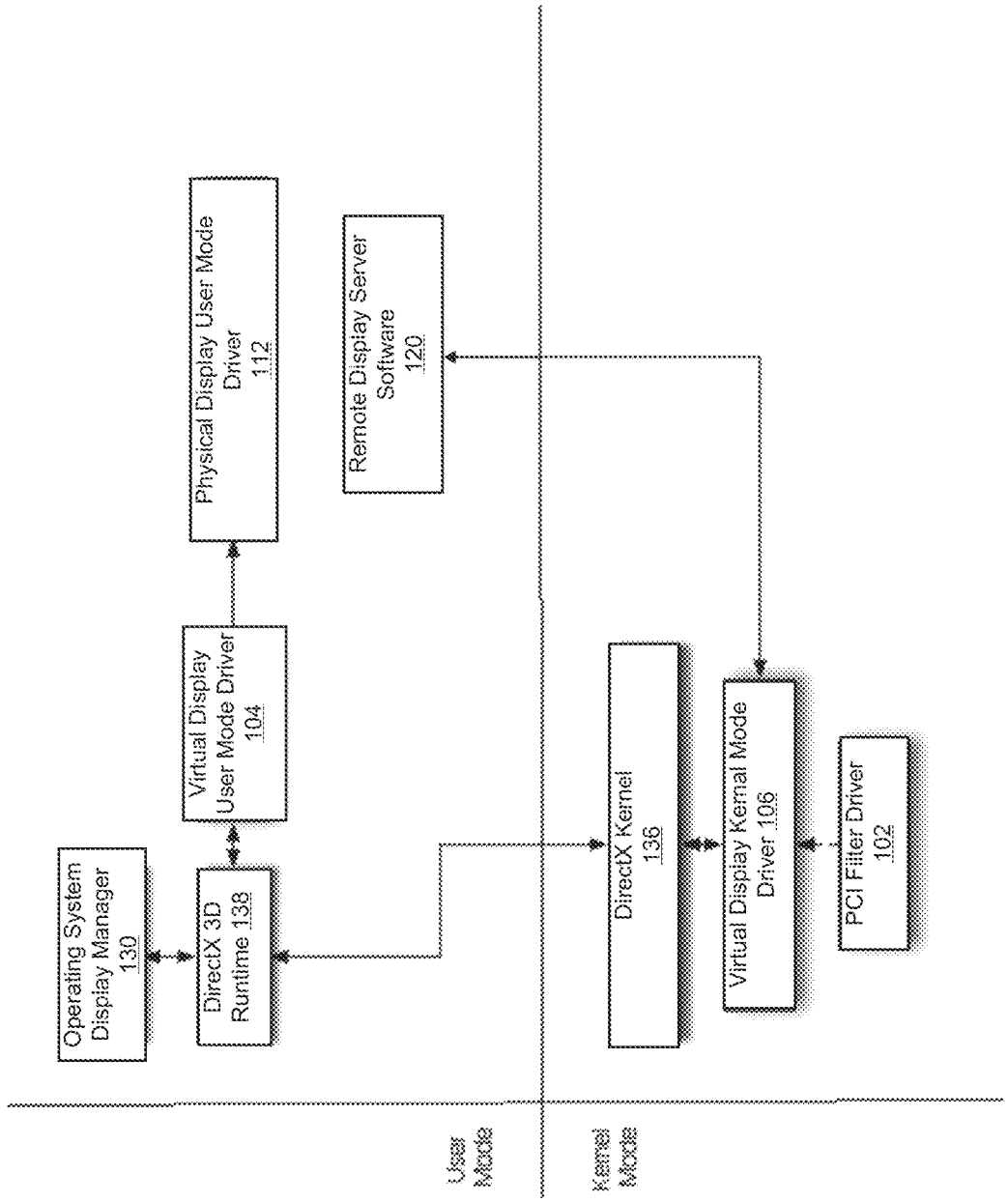
FIG. 6 shows the software layers as they relate to standard physical hardware and its interaction with the virtual WDDM display system.

FIG. 6 shows the software layers as they relate to standard physical hardware and its interaction with the virtual WDDM display system.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

What is claimed is:

1. A virtual display driver system, compatible with Windows Display Driver Model (WDDM), for generating a virtual display for a computer system with a Windows operating system comprising:
    a PCI filter driver configured to force an enumeration of a virtual display device;
    a virtual display kernel mode driver configured to provide management of memory and resources for the virtual display device in a manner that simulates a physical display device, wherein management includes management of a shared video memory, wherein the virtual display kernel mode driver uses chained callbacks at increasing IRQ levels for simulating a physical display device interrupt; and
    a user mode driver configured to search the computer system for an available physical display device, obtain an instance of a physical display user mode driver, and use the physical display device through the physical display user mode driver as a surrogate renderer for the virtual display driver system.

2. The virtual display driver system of claim 1, wherein the kernel driver synchronizes physical video memory resources with virtual system memory resources.

3. The virtual display driver system of claim 1, wherein the user mode driver is further configured to bridge function calls from an application to the physical display user mode driver.

4. The virtual display driver system of claim 1, further comprising:
    remote display server software configured to take video information from the shared video memory and send it to a remote display.

5. A virtual display driver system, compatible with Windows Display Driver Model (WDDM), for generating a virtual display for a computer system with a Windows operating system comprising:
    a PCI filter driver configured to force an enumeration of a Virtual display device;
    a virtual display kernel mode driver configured to provide management of memory and resources for the virtual display device in a manner that simulates a physical display device, wherein management includes management of a shared video memory, wherein the virtual display kernel mode driver uses chained callbacks at increasing IRQ levels for simulating a physical display device interrupt;
    a user mode driver configured to search the computer system for an available physical display device, obtain an instance of a physical display user mode driver, and use the physical display device through the physical display user mode driver as a surrogate renderer for the virtual display driver system; and
    wherein the virtual display kernel mode driver is further configured to obtain an interrupt running level upon receiving a DMA request by performing a series of calls to the operating system, each call to raise a running level up one level.

6. A method for generating a virtual display, compatible with Windows Display Driver Model (WDDM), for a computer system with a Windows operating system comprising:
    adding a hardware ID for a virtual display device to a list of devices as discovered by a PCI driver;
    requesting system memory and a hardware IRQ for use with the virtual display device;
    obtaining an instance of a virtual display kernel mode driver;
    obtaining an instance of a virtual display user mode driver;
    searching the computer system for an available physical display device for use as a surrogate display device;
    obtaining an instance of a physical display user mode driver for the surrogate display device;
    receiving video drawing commands into the virtual display user mode driver;
    sending translated video drawing commands from the virtual display user mode driver to the physical display user mode driver;
    sending translated user mode resources from the physical display user mode driver to the virtual display user mode driver;
    mapping translated user mode resources to simulated hardware level resources;
    sending translated user mode resources to an operating system display manager; and
    rendering a display image using the translated user mode resources.

7. The method of claim 6, further comprising:
    simulating an interrupt from a physical display device by sending a chain of callbacks from the virtual display kernel mode driver at increasing IRQ levels.

8. The method of claim 6, further comprising:
    when in compatibility mode, synchronizing a virtual video memory with a shared video memory.

9. The method of claim 8, further comprising:
    sending video information from the shared video memory and to a remote display.

10. A non-transitory computer-readable medium having stored thereon instructions which, when executed by a processor, cause the processor of a computer system to perform steps of a method for generating a virtual display, the method compatible with Windows Display Driver Model (WDDM), the method comprising:
    adding a hardware ID for a virtual display device to a list of devices as discovered by a PCI driver;
    requesting system memory and a hardware IRQ for use with the virtual display device;
    obtaining an instance of a virtual display user mode driver;
    searching the computer system for an available physical display device for use as a surrogate display device;
    obtaining an instance of a virtual display kernel mode driver;
    obtaining an instance of a physical display user mode driver for the surrogate display device;
    receiving video drawing commands into the virtual display user mode driver;

sending translated video drawing commands from the virtual display user mode driver to the physical display user mode driver;
sending translated user mode resources from the physical display user mode driver to the virtual display user mode driver;
mapping translated user mode resources to simulated hardware level resources;
sending translated user mode resources to an operating system display manager; and
rendering a display image using the translated user mode resources.

11. The non-transitory computer-readable medium of claim 10, having stored thereon further instructions which, when executed by the processor, cause the processor to perform the steps of:
simulating a physical display device interrupt by sending a chain of callbacks from the virtual display kernel mode driver at increasing IRQ levels.

12. The non-transitory computer-readable medium of claim 10, having stored thereon further instructions which, when executed by the processor, cause the processor to perform the steps of:
when in compatibility mode, synchronizing a virtual video memory with a shared video memory.

13. The non-transitory computer-readable medium of claim 12, having stored thereon further instructions which, when executed by the processor, cause the processor to perform the steps of:
sending video information from the shared video memory and to a remote display.

* * * * *